(12) United States Patent
Han et al.

(10) Patent No.: US 10,332,159 B2
(45) Date of Patent: Jun. 25, 2019

(54) APPARATUS AND METHOD FOR PROVIDING VIRTUAL ADVERTISEMENT

(71) Applicants: Eleven Street Co., Ltd., Seoul (KR); SK Planet Co., Ltd., Seongnam-si (KR)

(72) Inventors: Ju-Hyeun Han, Seoul (KR); Hyoung-Chul Shin, Seoul (KR); Su-Bin Lee, Yongin-si (KR); Byoung-Ki Jeon, Seoul (KR)

(73) Assignees: ELEVEN STREET CO., LTD., Seoul (KR); SK PLANET CO., LTD., Seongnam-si (KR)

( * ) Notice: Subject to any disclaimer, the term of this patent is extended or adjusted under 35 U.S.C. 154(b) by 711 days.

(21) Appl. No.: 14/896,194

(22) PCT Filed: Nov. 20, 2014

(86) PCT No.: PCT/KR2014/011188
§ 371 (c)(1),
(2) Date: Dec. 4, 2015

(87) PCT Pub. No.: WO2015/111833
PCT Pub. Date: Jul. 30, 2015

(65) Prior Publication Data
US 2016/0132941 A1    May 12, 2016

(30) Foreign Application Priority Data

Jan. 21, 2014  (KR) .......................... 10-2014-0007454
Jan. 22, 2014  (KR) .......................... 10-2014-0007512

(51) Int. Cl.
*G06Q 30/00*  (2012.01)
*G06Q 30/02*  (2012.01)
(Continued)

(52) U.S. Cl.
CPC ......... *G06Q 30/0277* (2013.01); *G06Q 30/02* (2013.01); *G06Q 30/0273* (2013.01);
(Continued)

(58) Field of Classification Search
None
See application file for complete search history.

(56) References Cited

U.S. PATENT DOCUMENTS

| 2004/0194128 | A1  | 9/2004 | McIntyre et al. |
| 2006/0026628 | A1* | 2/2006 | Wan ................ H04N 5/272 |
| | | | 725/32 |

(Continued)

FOREIGN PATENT DOCUMENTS

| CN | 1535013 A    | 10/2004 |
| JP | 2002287674 A | 10/2002 |

(Continued)

OTHER PUBLICATIONS

Yiqun Li Et al. Real Time Advertisement Insertion in Baseball Video Based on Advertisement Effect. (Nov. 6-11, 2005). Retrived online Feb. 5, 2019. https://dl.acm.org/citation.cfm?id=1101221 (Year: 2005).*

(Continued)

*Primary Examiner* — James A Reagan
(74) *Attorney, Agent, or Firm* — Brinks Gilson & Lione

(57) ABSTRACT

The present invention relates to an apparatus and method for providing a virtual advertisement, and more particularly to an apparatus and method that can determine the size of a virtual advertisement image to be inserted into a moving image while taking into account the size of an advertising region included in the moving image, that can select an appropriate virtual advertisement image based on the determined size of the virtual advertisement image, and that can measure the objective exposure level of a virtual indirect (Continued)

advertisement and calculate advertising expenses based on the measured objective exposure level. Furthermore, there are provided an apparatus and method that select a virtual advertisement image to be inserted into an advertising region while taking into account the size of a virtual advertising region that varies depending on the angle of a camera or the posture of a virtual advertisement object.

13 Claims, 9 Drawing Sheets

(51) Int. Cl.
　　　*H04N 21/23*　　　(2011.01)
　　　*H04N 21/234*　　(2011.01)
　　　*H04N 21/81*　　　(2011.01)
(52) U.S. Cl.
　　　CPC ........... *H04N 21/23* (2013.01); *H04N 21/234* (2013.01); *H04N 21/812* (2013.01)

(56) References Cited

U.S. PATENT DOCUMENTS

2007/0024444 A1　2/2007　Fukuda
2009/0091571 A1　4/2009　Zalewski
2010/0131355 A1　5/2010　Kitchen et al.
2014/0278847 A1*　9/2014　Gallo ................ G06Q 30/0252
　　　　　　　　　　　　　　　　　　　　　　　705/14.5

FOREIGN PATENT DOCUMENTS

| JP | 2009093183 A | | 4/2009 | |
|---|---|---|---|---|
| JP | 2014182437 A | * | 9/2014 | ......... G06Q 30/0246 |
| KR | 1020000054328 A | | 9/2000 | |
| KR | 1020030002919 A | | 1/2003 | |
| KR | 1020030090372 A | | 11/2003 | |
| KR | 1020070072673 A | | 7/2007 | |
| KR | 1020090034330 A | | 4/2009 | |
| KR | 1020090115788 A | | 11/2009 | |
| KR | 1020110001331 A | | 1/2011 | |
| KR | 101020991 B1 | | 3/2011 | |
| KR | 1020110123653 A | | 11/2011 | |
| KR | 101105476 B1 | | 1/2012 | |
| KR | 1020130035151 A | | 4/2013 | |
| KR | 1020130056532 A | | 5/2013 | |
| WO | 2009002104 A2 | | 12/2008 | |
| WO | 2009038258 A1 | | 3/2009 | |

OTHER PUBLICATIONS

International Search Report for PCT/KR2014/011188 dated Mar. 4, 2015.

* cited by examiner $$E = \frac{aS \times bT}{cA \times dC \times eF \times fD \times gV}$$

FIG. 9

APPARATUS AND METHOD FOR PROVIDING VIRTUAL ADVERTISEMENT

CROSS REFERENCE TO RELATED APPLICATION

This application claims the priority of Korean Patent Application No. 10-2014-0007454 filed on Jan. 21, 2014, and Korean Patent Application No. 10-2014-0007512 filed on Jan. 22, 2014, in the Korean Patent and Trademark Office. Further, this application is the National Phase application of International Application No. PCT/KR2014/011188 filed on Nov. 20, 2014, which is incorporated herein by reference in its entirety.

TECHNICAL FIELD

The present invention relates generally to an apparatus and method for providing a virtual advertisement, and more particularly to an apparatus and method for providing a virtual advertisement, which can determine the size of a virtual advertisement image to be inserted into a moving image while taking into account the size of an advertising region included in the moving image, which can select an appropriate virtual advertisement image based on the determined size of the virtual advertisement image, and which can measure the objective exposure level of a virtual indirect advertisement and calculate advertising expenses based on the measured objective exposure level.

BACKGROUND ART

In line with a recent increase in the scale of the advertising market, broadcasting companies that present dramas, movies and sports broadcasts are greatly interested in indirect advertising (or product placement) or virtual advertising that can increase an advertising effect by inserting an image of an advertising item into a drama or sports broadcast.

Generally, indirect advertising is a marketing technique that indirectly advertises an advertising target product by presenting the advertising target product when a moving image, such as a movie, a drama or the like, is produced. Indirect advertising is a method of exposing an advertising target product in a moving image without incompatibility by disposing the advertising target product in the form of a prop when the moving image is produced, thereby naturally exhibiting an advertising effect while preventing viewers from having a sense of viewing advertising.

In contrast, virtual advertising refers to advertising that is performed by inserting a virtual advertisement image of an advertising target product or the like, which is not present when a moving image is produced, into a moving image of a movie, a drama, a sports broadcast or the like, using a virtual imaging method.

Virtual imaging is an image processing and synthesizing technique that inserts an image into a specific space or virtual space in real time during the live broadcasting of various types of broadcast media and images and performs processing so that the inserted image is fixed at a specific point using tracking technology and seems to be actually included in a corresponding image screen. This image processing technique is widely being used in live sports broadcasts and live event broadcasts, and is also applied to various application fields, such as advertising and the provision of game information images.

Virtual advertising is performed by applying the above image processing technique to an advertising field. A virtual advertisement image is received from an advertiser or generated using computer graphics, and the virtual advertisement image is inserted into an original moving image, thereby exposing the advertisement image to a viewer who is viewing the moving image. However, the size of a virtual advertising region for insertion may vary depending on the angle of a camera or the posture of a virtual advertisement object, and thus such a characteristic needs to be taken into account when a virtual advertisement image to be inserted into the virtual advertising region is selected.

Furthermore, the calculation of the advertising expenses of a virtual advertisement is an issue of great importance to an advertiser. However, since there are no clear criteria, there is difficulty calculating objective advertising expenses that can be accepted by the advertiser.

If the level at which a virtual advertisement is exposed in video image content can be objectively measured and advertising expenses can be transparently calculated based on the exposure level, an advertiser can trust the calculated advertising expenses.

Related preceding technologies include Korean Patent No. 10-1105476 published on Jan. 5, 2012 (entitled "Method of Providing Advertising Service via Synthesis of Moving Image) and Korean Patent Application Publication No. 10-2013-0035151 published on Apr. 8, 2013 (entitled "Advertising Service Provision Method that Differentially Charges Advertising Expenses for Outdoor Advertising).

DISCLOSURE

Technical Problem

An object of the present invention is to provide an apparatus and method for selecting a virtual advertisement image to be inserted into an advertising region while taking into account the size of the virtual advertising region that varies depending on the angle of a camera or the posture of a virtual advertisement object.

Furthermore, an object of the present invention is to provide an apparatus and method for selecting an optimum virtual advertisement image to be inserted into the advertising region of a moving image in order to prevent problems, such as a resolution problem, from occurring due to the specifications of the terminal of a user who views the moving image into which the virtual advertisement image has been inserted.

Furthermore, an object of the present invention is to measure characteristics, including the size, time, angle and location in, for, at, and at which a virtual indirect advertisement inserted into video image content is exposed, the speed at which the virtual indirect advertisement moves within a screen, the size of the region of the virtual indirect advertisement which is covered with another object, and the frequency at which the virtual indirect advertisement is covered with another object.

Furthermore, an object of the present invention is to measure an objective exposure level in compliance with predetermined various criteria based on measured characteristics.

Furthermore, an object of the present invention is to calculate the advertising expenses of a virtual indirect advertisement based on a measured objective exposure level.

Technical Solution

In order to accomplish the above objects, an embodiment of the present invention provides an apparatus for providing a virtual advertisement, including: a virtual advertisement selection unit configured to receive an original image and select a virtual advertisement image appropriate for insertion into the original image based on resolution; and an advertising expense calculation unit configured to process the virtual advertisement image, insert the virtual advertisement image into the original image, and calculate advertising expenses by measuring the exposure level of the virtual advertisement image.

In this case, the virtual advertisement selection unit may include: an image input unit configured to receive the original image; a selection criteria generation unit configured to generate selection criteria, including a resolution criterion for the virtual advertisement image to be inserted into a virtual advertising region, based on the size of the virtual advertising region included in the original image; and an advertisement image selection unit configured to select the virtual advertisement image, to be inserted into the advertising region included in the original image, based on the generated selection criteria.

In this case, the image input unit may receive the original image on a per frame basis.

In this case, the selection criteria generation unit may include: a clustering unit configured to cluster one or more frames including advertising regions in the original image; and a frame selection unit configured to select any one frame based on the size of the advertising region included in each of the clustered frames.

In this case, the frame selection unit may calculate the size of the advertising region included in each of the clustered frames, and selects a frame having a size, which is the largest in the calculated sizes of the advertising regions, as the any one frame.

In this case, the selection criteria generation unit may include a number-of-pixels calculation unit configured to calculate the number of pixels of the advertising region included in the selected frame when the any one frame has been selected by the frame selection unit.

In this case, the selection criteria generation unit may generate the selection criteria for the virtual advertisement image based on the calculated number of pixels.

In this case, the selection criteria generation unit may generate the resolution criterion so the resolution criterion has a resolution larger than the calculated number of pixels, and may limit the virtual advertisement image to be inserted into the original image to only a virtual advertisement image that satisfies the resolution criterion.

In this case, the advertisement image selection unit may select one or more virtual advertisement images, to be inserted into the advertising region of each of the clustered frames, from candidate virtual advertisement images that satisfy the selection criteria.

In this case, the advertisement image selection unit may select the virtual advertisement image to be inserted into the advertising region of each of the frames so that the resolution of the virtual advertisement image to be inserted into the advertising region is proportional to the size of the advertising region of the corresponding frame.

In this case, the advertising expense calculation unit may include: an advertisement processing unit configured to process the virtual advertisement image based on a preliminary processing characteristic so that the virtual advertisement image can be inserted into the original image; an advertisement insertion unit configured to insert the processed virtual advertisement image into the original image; an exposure measurement unit configured to measure the exposure level of the virtual advertisement image based on exposure characteristics in which the virtual advertisement image is exposed in the original image; and an advertising expense calculation unit configured to calculate the advertising expenses of the virtual advertisement image based on the exposure level.

In this case, the exposure characteristics may include a real-time characteristic, measured in real time while the virtual advertisement image is being exposed in the original image, and the preliminary processing characteristic.

In this case, the advertisement insertion unit may insert a new advertisement at each location where the virtual advertisement image is exposed when the exposure level reaches a preset criterion.

In this case, the exposure measurement unit may include: a size measurement unit configured to measure the exposure level in proportion to the ratio of the size of an exposed region of the virtual advertisement image, which is exposed in the original image, to the size of the overall screen; a time measurement unit configured to measure the exposure level in proportion to the time during which the virtual advertisement image is exposed in the original image; a deformation measurement unit configured to measure the exposure level in inverse proportion to the difference between an angle at which the virtual advertisement image is exposed in the original image and a preset reference angle; a covering size measurement unit configured to measure the exposure level in inverse proportion to a size of the region of the virtual advertisement image that is covered with another object while the virtual advertisement image is being exposed in the original image; a covering frequency measurement unit configured to measure the exposure level in inverse proportion to the frequency at which the virtual advertisement image is covered with another object while the virtual advertisement image is being exposed in the original image; a location measurement unit configured to measure the exposure level in proportion to the proximity of the virtual advertisement image to the center of the screen; a speed measurement unit configured to measure the exposure level in inverse proportion to the speed at which the virtual advertisement image moves within the screen while the virtual advertisement image is being exposed in the original image; and an exposure calculation unit configured to calculate a total exposure level by collecting exposure levels measured based on the exposure characteristics; wherein the advertising expense calculation unit measures the advertising expenses in proportion to the total exposure level.

Furthermore, an embodiment of the present invention provides a method of providing a virtual advertisement, including: receiving an original image, and selecting a virtual advertisement image appropriate for insertion into the original image based on resolution; and processing the virtual advertisement image, inserting the virtual advertisement image into the original image, and calculating advertising expenses by measuring the exposure level of the virtual advertisement image.

In this case, selecting the virtual advertisement image may include: receiving the original image; generating selection criteria, including a resolution criterion for the virtual advertisement image based on the size of the virtual advertising region included in the original image; and selecting the virtual advertisement image, to be inserted into the original image, based on the generated selection criteria.

In this case, calculating the advertising expenses may include: selecting the virtual advertisement image that will be inserted into the original image; processing the virtual advertisement image based on a preliminary processing characteristic so that the virtual advertisement image can be inserted into the original image; inserting the processed virtual advertisement image into the original image; measuring the exposure level of the virtual advertisement image based on exposure characteristics in which the virtual advertisement image is exposed in the original image; and calculating the advertising expenses of the virtual advertisement image based on the exposure level.

As another means for solving the problems, there is provided a computer-readable storage medium having stored thereon a program for executing a cloud computing-based data management method.

Advantageous Effects

According to the present invention, there may be provided an apparatus and method for selecting a virtual advertisement image to be inserted into an advertising region while taking into account the size of the virtual advertising region that varies depending on the angle of a camera or the posture of a virtual advertisement object.

Furthermore, the present invention may provide an apparatus and method for selecting an optimum virtual advertisement image to be inserted into the advertising region of a moving image in order to prevent a problem, such as a resolution problem, from occurring due to the specifications of the terminal of a user who views the moving image into which th virtual advertisement image has been inserted.

Furthermore, the present invention may measure characteristics, including the size, time, angle and location in, for, at and at which a virtual indirect advertisement inserted into video image content is exposed, the speed at which the virtual indirect advertisement moves within a screen, the size of the region of the virtual indirect advertisement which is covered with another object, and the frequency at which the virtual indirect advertisement is covered with another object.

Furthermore, the present invention may measure an objective exposure level in compliance with predetermined various criteria based on measured characteristics.

Furthermore, the present invention may calculate the advertising expenses of a virtual indirect advertisement based on a measured objective exposure level.

DESCRIPTION OF DRAWINGS

FIG. 9 is a diagram showing an example of a formula calculated by the exposure measurement unit shown in FIG. 7;

MODE FOR INVENTION

Figure 1:
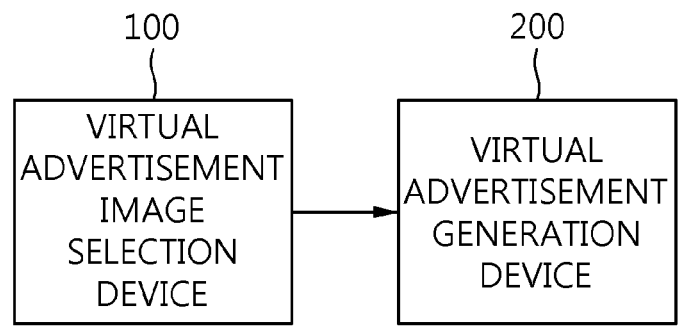
FIG. 1 is a block diagram showing a system for providing a virtual advertisement according to an embodiment of the present invention.

Preferred embodiments of the present invention will be described in detail below with reference to the accompanying drawings. However, detailed descriptions of well-known functions and configurations that may make the gist of the present invention unnecessarily obscure will be omitted in the following description and the attached drawings. Furthermore, it should be noted that the same components are designated by the same reference symbols throughout the drawings as much as possible.

The terms and words used in the following specification and the claims should not be restrictively interpreted as having common and dictionary meanings, but should be interpreted as having meanings and concepts in conformity with the technical spirit of the present invention based on the principle that an inventor can appropriately define the concepts of terms in order to describe his or her invention in the best way. Accordingly, since the embodiments described in the present specification and the configurations shown in the drawings merely correspond to the preferred embodiments of the present invention and do not cover all the technical spirit of the present invention, it should be appreciated that there may be various equivalents and modifications that may replace the configurations at the time at which the present application is filed. Furthermore, the terms "first," "second" and so on are used to describe various components, and are intended to distinguish one component from other components but are not intended to limit these components.

Although a terminal according to an embodiment of the present invention will be described using a mobile communication terminal capable of connecting with a communication network and uploading and downloading content based on a cloud computing system as a representative example, the terminal is not limited to a mobile communication terminal, but may include various terminals, such as all information and communication devices, multimedia terminals, wired terminals, fixed terminals, Internet Protocol (IP) terminals, etc. Furthermore, the terminal may be advantageously used when it is a mobile terminal having various mobile communication specifications, such as a mobile phone, a Portable Multimedia Player (PMP), a Mobile Internet Device (MID), a smart phone, a desktop, a tablet PC, a notebook, a netbook, or an information and communication device.

FIG. 1 is a block diagram showing a system for providing a virtual advertisement according to an embodiment of the present invention.

Referring to FIG. 1, the system for providing a virtual advertisement according to the embodiment of the present invention includes a virtual advertisement image selection device 100 and a virtual advertisement generation device 200.

The system for providing a virtual advertisement according to the present embodiment may be a system corresponding to a virtual advertisement selection unit included in an apparatus for providing a virtual advertisement according to the present invention.

The system for providing a virtual advertisement according to the present embodiment enables an additional advertising effect to be obtained in such a way that when the virtual advertisement image selection device 100 selects a virtual advertisement image appropriate for an original image, the virtual advertisement generation device 200 inserts the virtual advertisement image, which was not present when the original image was created, into the original image and provides the image to a user.

The virtual advertisement image selection device 100, when inserting a virtual advertisement image into an original image, such as one of a TV drama, a movie, a sports broadcast image, other various moving images, etc., may generate criteria for the selection of a virtual advertisement image to be selected, and may select a virtual advertisement image most appropriate for the original image in compliance with the selection criteria.

In this case, candidate virtual advertisement images that may be inserted into the original image may be generated in advance. For example, candidate virtual advertisement images to be inserted into the corresponding original image may be generated via a preprocessing process in advance. Alternatively, a candidate virtual advertisement image for an advertising item may be received from an advertiser in advance and be then managed.

Furthermore, the virtual advertisement image selection device 100 may generate various virtual advertisement images for an advertising item in conformity with the generated selection criteria when there are no virtual advertisement images that have been generated in advance.

Meanwhile, a virtual advertising region, i.e., a section into which a virtual advertisement image will be inserted, may be set in the original image, and the section into which a virtual advertisement image will be inserted may be composed of a plurality of frames.

In this case, in the frames including the virtual advertising region, a virtual advertisement target, for example, a building that is a background of a movie or drama, a product that is possessed by a cast member or the like, may be present at a location corresponding to a location at which the virtual advertisement image is inserted.

Generally, when such an advertisement target is photographed, the size of the virtual advertising region may vary depending on the angle of a camera, the posture of the advertisement target, or the like.

According to the present embodiment, an appropriate virtual advertisement image to be inserted into an original image may be selected or generated by taking into account the size of the virtual advertising region that varies depending on the posture of a virtual advertisement target in the original image or the angle of a camera that photographs the virtual advertisement target, as described above.

According to this, a user who views an image into which a virtual advertisement image selected by the virtual advertisement image selection device 100 has been inserted can be subjected to an optimum advertising effect regardless of the resolution of his or her terminal.

When the virtual advertisement image to be inserted into the original image is selected by the virtual advertisement image selection device 100, the virtual advertisement generation device 200 generates a virtual advertisement by inserting the selected virtual advertisement image into the corresponding advertising region of the original image.

The virtual advertisement generation device 200 may set the virtual advertising region, i.e., a section into which a virtual advertisement image will be inserted, in the original image into which the virtual advertisement image will be inserted. In this case, the virtual advertising region may be composed of a plurality of frames in the original image.

The virtual advertisement generation device 200 may synthesize a virtual advertisement image, selected by the virtual advertisement image selection device 100, with the virtual advertising region of each frame, thereby enabling the virtual advertisement image to be inserted into the original image without incompatibility.

In this case, when virtual advertisement images to be inserted into the virtual advertising region for respective frames are selected by the virtual advertisement image selection device 100, the virtual advertisement generation device 200 may insert the selected virtual advertisement images into the virtual advertising region of the corresponding frames.

Meanwhile, the virtual advertisement generation device 200 may track the location of the virtual advertising region, i.e., the location of the virtual advertisement target, in the original image, and may synthesize a corresponding virtual advertisement image with the tracked location.

Figure 2:
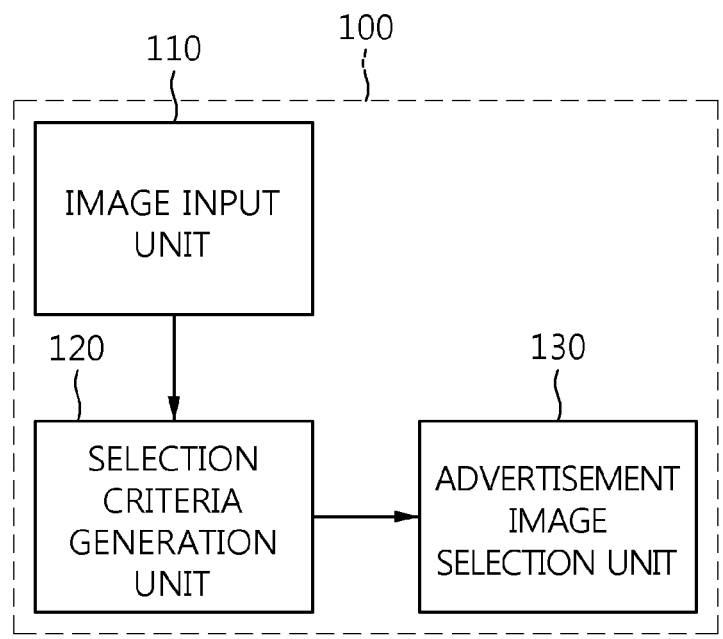
FIG. 2 is a block diagram showing an example of the virtual advertisement image selection device shown in FIG. 1.

FIG. 2 is a block diagram showing an example of the virtual advertisement image selection device shown in FIG. 1.

Referring to FIG. 2, the virtual advertisement image selection device 100 shown in FIG. 1 may include an image input unit 110, a selection criteria generation unit 120, and an advertisement image selection unit 130.

The image input unit 110 receives an original image that will be synthesized with a virtual advertisement image to provide virtual advertisement service. In this case, the original image may be received on a per frame basis.

In this case, the original image may be various types of moving image content, such as a TV drama, a movie, a sports broadcast video, as described above.

Furthermore, the received original image may include a virtual advertising region into which a virtual advertisement image will be inserted, and the virtual advertising region may be set for one or more frames by the virtual advertisement generation device 200 of FIG. 1 in advance.

The selection criteria generation unit 120 generates selection criteria including a criterion for the resolution of a virtual advertisement image that will be inserted into the virtual advertising region of the original image. In this case, the resolution criterion may be a minimum resolution criterion for insertion into the virtual advertising region.

In this case, the selection criteria generation unit 120 may calculate the size of a virtual advertising region included in each frame of the original image, and may generate selection criteria by taking into account the calculated size of the virtual advertising region of the frame, as described above.

Figure 3:
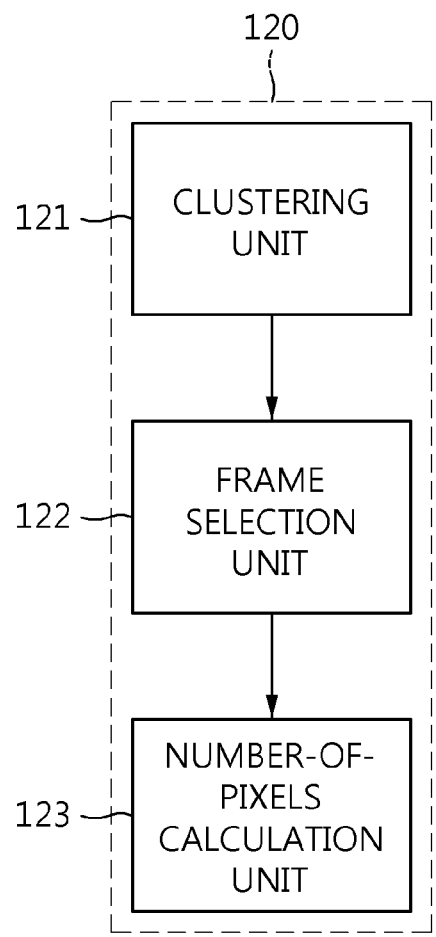
FIG. 3 is a block diagram showing an example of the selection criteria generation unit shown in FIG. 2.

FIG. 3 is a block diagram showing an example of the selection criteria generation unit shown in FIG. 2.

Figure 4:
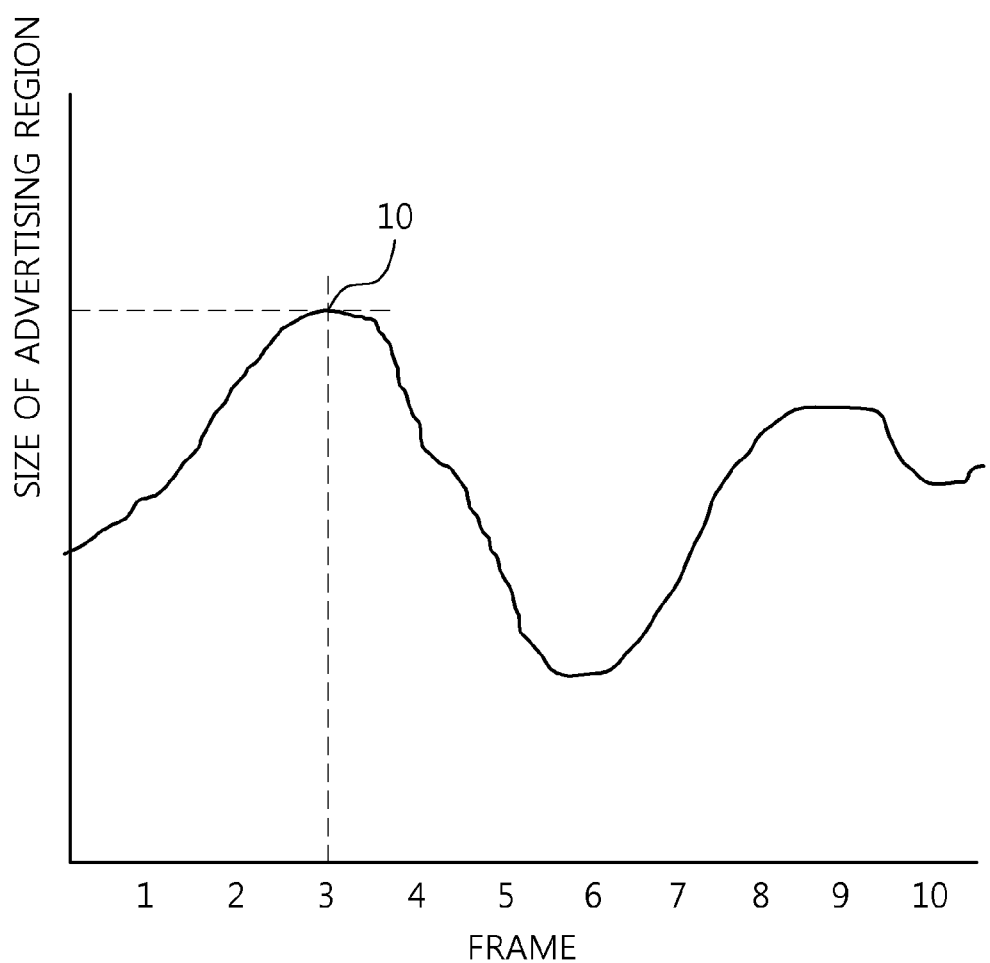
FIG. 4 is a diagram illustrating an example of generating virtual advertisement image selection criteria according to an embodiment.

FIG. 4 is a diagram illustrating an example of generating virtual advertisement image selection criteria according to an embodiment.

The function that is performed by the selection criteria generation unit 120 is described in greater detail with reference to FIGS. 3 and 4.

As shown in FIG. 3, the selection criteria generation unit 120 may include a clustering unit 121, a frame selection unit 122, and a number-of-pixels calculation unit 123.

When the image input unit 110 receives an original image on a per frame basis, the clustering unit 121 may determine whether a virtual advertising region is included in a corresponding frame. Furthermore, the clustering unit 121 may cluster frames, including virtual advertising regions, into a single group based on the results of the determination.

FIG. 4 is a graph in which the clustering unit 121 clusters frames 1 to 10 including virtual advertising regions, i.e., sections into which virtual advertisements can be inserted, and represents the frames 1 to 10 in accordance with the sizes of the virtual advertising regions included in the respective frames 1 to 10.

When the frames 1 to 10 including the virtual advertising regions are clustered by the clustering unit 121, the frame selection unit 122 may calculate the sizes of the virtual advertising regions for the respective clustered frames 1 to 10 in order to incorporate the feature of varying depending on the photographing angle of a camera or the posture of a virtual advertisement target and accordingly influencing the size of the virtual advertising region of each frame, as described above.

As described above, the calculated size of the virtual advertising region of each frame may be represented as shown in FIG. 4.

Once the sizes of the virtual advertising regions have been calculated for the respective clustered frames 1 to 10, the frame selection unit 122 may select a single reference frame based on the calculated size information.

For example, the frame selection unit 122 may select a frame having a size, which is the largest of the calculated sizes of the virtual advertising regions, as any one reference frame.

Referring to that shown in FIG. 4, in this case, the frame calculation unit 122 may select frame 3 having a size, which is the largest of the calculated sizes of the virtual advertising regions of 10 clustered frames 1 to 10, as any one frame that becomes a reference that is used to generate criteria for the selection of a virtual advertisement image to be inserted into an original image.

According to another example, the frame selection unit 122 may compare the size of a virtual advertising region calculated for the virtual advertising region of each of the clustered frames 1 to 10 with a preset threshold value, and may select any one from frames whose virtual advertising region sizes exceed the threshold value.

According to an example, a frame having a size, which is the largest of the sizes of the virtual advertising regions of frames whose virtual advertising region sizes exceed the threshold value based on the results of the comparison, may be selected as any one frame that becomes a reference that is used to generate criteria for the selection of a virtual advertisement image.

As described above, a method of selecting any one reference frame is limited to the above illustrated methods, but various methods may be employed when necessary.

Once any one reference frame has been selected by the frame selection unit 122, the number-of-pixels calculation unit 123 may calculate the number of pixels of a virtual advertising region included in the selected frame.

Referring back to FIG. 2, once the number of pixels has been calculated for the virtual advertising region of the reference frame by the number-of-pixels calculation unit 123, the selection criteria generation unit 120 may generate criteria for the selection of a virtual advertisement image based on the calculated number of pixels.

For example, when the number of pixels of the virtual advertising region of the reference frame is calculated by the number-of-pixels calculation unit 123 of FIG. 3, the selection criteria generation unit 120 may generate selection criteria that limit the virtual advertisement image, which can be inserted into the virtual advertising region of the original image, to only a virtual advertisement image having a resolution equal to or higher than the number of pixels among a plurality of candidate virtual advertisement images.

Alternatively, the selection criteria generation unit 120 may set a resolution range based on the number of pixels calculated for the reference frame, and may generate selection criteria that allow only a virtual advertisement image having resolution within the set resolution range to be inserted into a virtual advertising region.

In this case, the minimum and maximum values of the resolution range may be set to values smaller and larger than the calculated number of pixels, respectively, and the resolution range does not necessarily need to be equal to or larger than the calculated number of pixels of the reference frame.

In this case, a user may analyze the appropriate resolutions of virtual advertisement images synthesized with virtual advertising regions within various original images, and may set various resolution ranges based on the results of the analysis in advance, via a preprocessing process.

When there are criteria, such as the threshold value information set by the user in advance as described above or resolution range information variously set based on the sizes of the virtual advertising regions, the selection criteria generation unit 120 may generate the most appropriate selection criteria based on the corresponding criteria.

Once the criteria for the selection of a virtual advertisement image has been generated by the selection criteria generation unit 120, the advertisement image selection unit 130 may select or generate a virtual advertisement image to be synthesized with and inserted into the original image in compliance with the generated selection criteria.

In this case, the virtual advertisement image selection device 100 may further include a virtual advertisement image database (not shown) when necessary.

The virtual advertisement image database may include virtual advertisement items to be inserted for respective original images, and candidate virtual advertisement images for the virtual advertisement items.

In this case, the virtual advertisement items and the candidate virtual advertisement images for the original images may be received from advertisers who want to place advertisements in advance. Alternatively, virtual advertisement images generated by the advertisement image selection unit 130 may be stored as the candidate advertisement images, as will be described later.

Once the criteria for the selection of a virtual advertisement image has been generated, the advertisement image selection unit 130 may determine whether there are one or more candidate virtual advertisement images that will be inserted into the virtual advertising region of the input original image.

If there are one or more candidate virtual advertisement images for the input original image, only a candidate virtual advertisement image that satisfies the selection criteria may be selected as a virtual advertisement image that will be inserted into the original image.

In this case, the resolution of a virtual advertisement image to be inserted into the advertising region of each frame may be determined based on the size of the advertising region of each of the clustered frames.

That is, since the sizes of the virtual advertising regions of respective frames are various, it may be possible to select virtual advertisement images for the respective frames so that the resolutions of virtual advertisements to be inserted into the virtual advertising regions of the respective frames are proportional to the sizes of the virtual advertising regions of the respective frames, rather than inserting virtual advertisement images having the same resolution, which satisfy the selection criteria, into the respective frames.

Meanwhile, if there are not one or more candidate virtual advertisement images to be inserted into the input original image, the advertisement image selection unit 130 may generate a virtual advertisement image for a corresponding advertising item.

In this case, once the virtual advertisement image that satisfies the selection criteria has been generated, the advertisement image selection unit 130 may variously modify and generate the virtual advertisement image so that it harmonizes with the virtual advertisement target of each frame.

Figure 5:
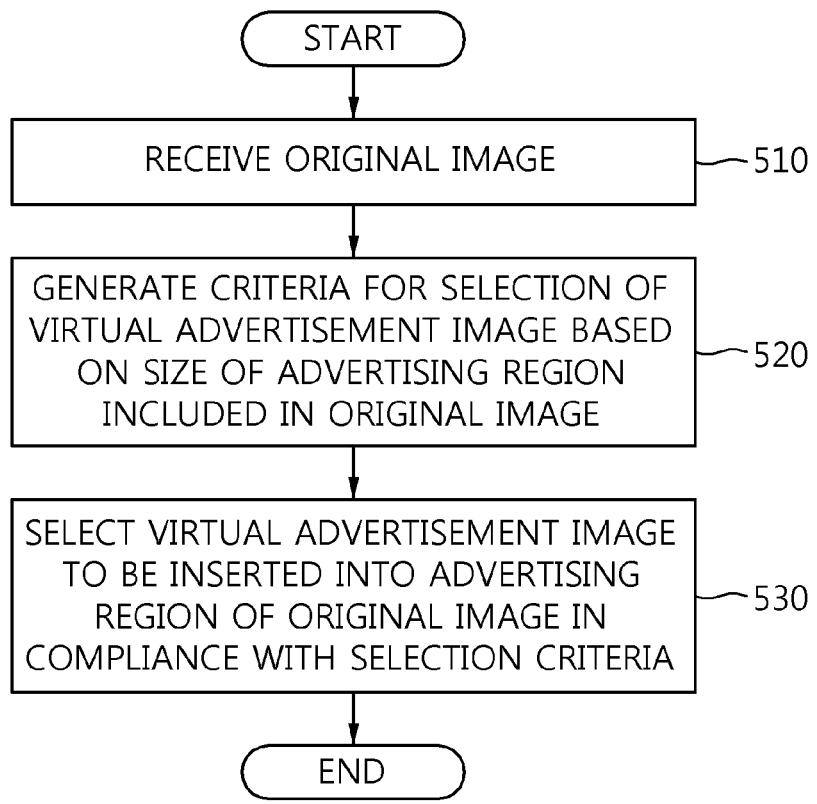
FIG. 5 is an operation flowchart showing a method of selecting a virtual advertisement image according to an embodiment of the present invention.

FIG. 5 is an operation flowchart showing a method of selecting a virtual advertisement image according to an embodiment of the present invention.

Figure 6:
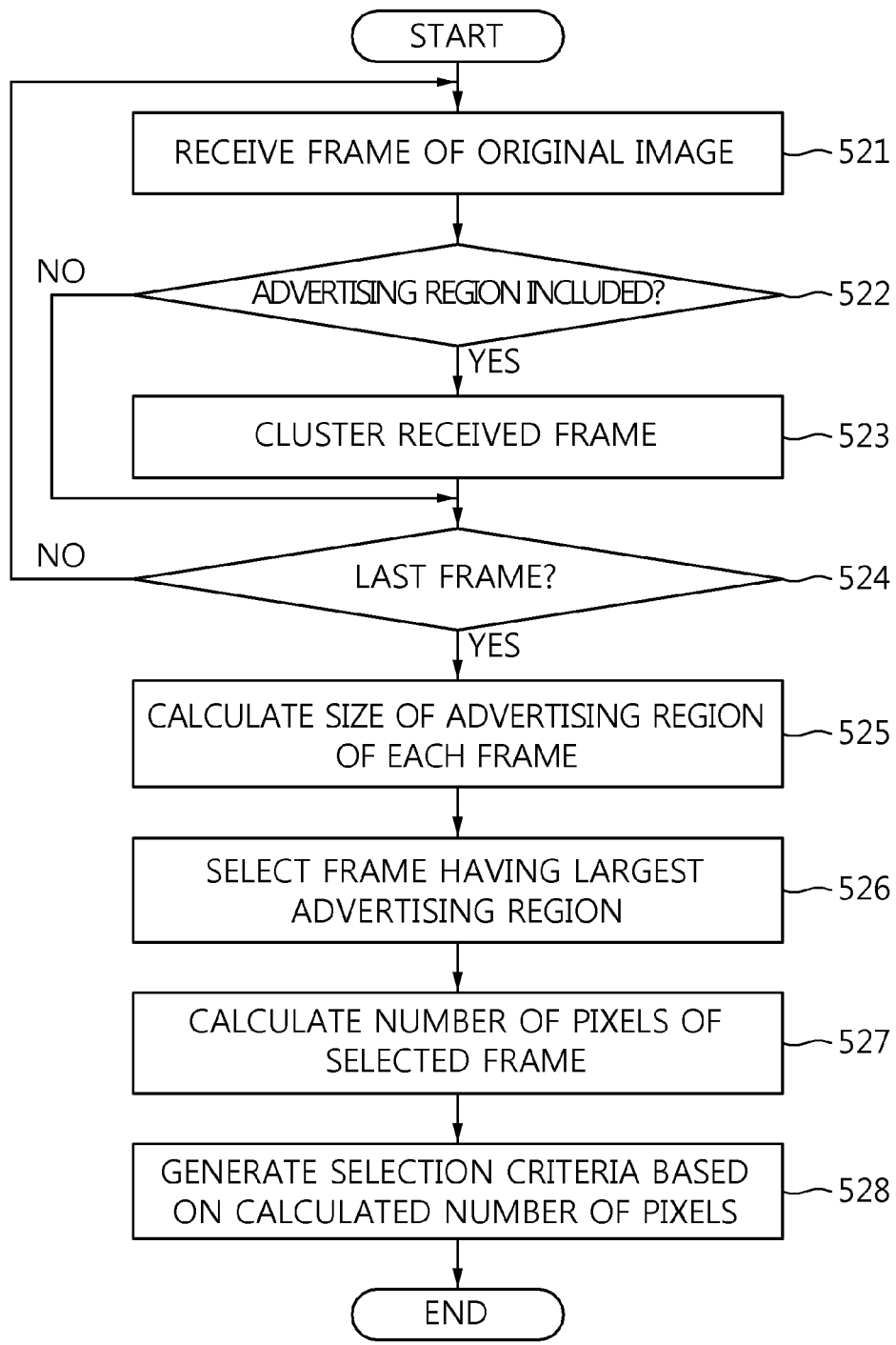
FIG. 6 is an operation flowchart showing an example of the step of generating selection criteria, shown in FIG. 5, in detail.

FIG. 6 is an operation flowchart showing an example of the step of generating selection criteria, shown in FIG. 5, in detail.

FIGS. 5 and 6 may show an embodiment of a method of selecting a virtual advertisement image that is performed by the virtual advertisement image selection device 100 according to the embodiment of FIG. 2.

In this case, a method of providing a virtual advertisement according to an embodiment of the present invention may include the content of the method of selecting a virtual advertisement image.

Referring to FIG. 5, first, the virtual advertisement image selection device 100 receives an original image that will be synthesized with a virtual advertisement image to generate a virtual advertisement at step 510.

In this case, the original image may be various types of moving image content, such as a TV drama, a movie, and a sports broadcast image, and may be received on a per frame basis.

Meanwhile, a virtual advertising region, i.e., a section into which a virtual advertisement image will be inserted, may be set in the original image, and the virtual advertising region may be set for a plurality of frames.

Thereafter, criteria for the selection of a virtual advertisement image to be inserted into the advertising region are generated based on the size of the advertising region included in the received original image at step 520.

Referring to that shown in FIG. 6, step 520 of generating criteria for the selection of a virtual advertisement image is described in greater detail.

First, when an original image is received on a per frame basis at step 521, the virtual advertisement image selection device 100 determines whether each frame includes a virtual advertising region at step 522.

Thereafter, if, as a result of the determination, it is determined that the current frame includes a virtual advertising region, the frame is clustered as a frame including a virtual advertising region at step 523.

Thereafter, when the current frame is clustered because it includes a virtual advertising region, it is determined whether the current frame is the last frame of the received original at step 524.

In the same manner, if, as a result of the determination of whether the current frame includes a virtual advertising region at step 522, it is determined that the current frame does not include a virtual advertising region, it is determined whether the current frame is the last frame at step 524.

Thereafter, if, as a result of the determination of whether the current frame is the last frame at step 524, it is determined that the current frame is not the last frame, the process returns to step 521 of receiving a subsequent frame of the original image and repeatedly performs the above-described process on the received subsequent frame.

If, as a result of the determination of whether the current frame is the last frame at step 524, it is determined that the current frame is the last frame, the size of an advertising region may be calculated for each clustered frame at step 525.

As described above, the size of the advertising region calculated for each clustered frame may be represented in the form of a graph, as shown in FIG. 4. Referring to that shown in FIG. 4, the size of the advertising region may be easily determined for each frame.

According to this, calculating the size of the virtual advertising region included in each frame may incorporate the feature of varying depending on the photographing angle of a camera or the posture of a virtual advertisement target and accordingly influencing the size of the virtual advertising region of each frame, thereby increasing the quality of an image, into which the virtual advertisement has been inserted, to be provided to a user and also improving a virtual advertising effect.

Thereafter, once the size of the virtual advertising region has been calculated for each frame, any one frame that is used to generate criteria for the selection of a virtual advertisement image may be selected using the calculated size of the virtual advertising region information at step 526.

For example, as shown in FIG. 6, a frame having a size that is the largest of the calculated sizes of the virtual advertising regions may be selected as any one reference frame.

A description is given using FIG. 4 as an example. The frame 3 having a size, which is the largest of the sizes of the virtual advertising regions of the 10 frames 1 to 10 clustered at step 523, may be selected as any one frame that becomes a reference that is used to generate criteria for the selection of a virtual advertisement image.

Meanwhile, as described above, this is merely an example, and thus a method of selecting a reference frame is not particularly limited. It may be possible to compare the calculated sizes of virtual advertising regions with a preset threshold value and then select any one from frames whose virtual advertising region sizes exceed the threshold value.

Meanwhile, if the number of clustered frames is one at step 523 of clustering frames including virtual advertising regions, step 525 of calculating the size of the advertising region of each frame may be omitted.

In this case, at step 526 of selecting a reference frame, the clustered frame may be selected as the reference frame.

Thereafter, once any one reference frame has been selected at step 526 of selecting a reference frame that is used to generate criteria for the selection of a virtual advertisement image, the number of pixels of the selected frame may be calculated at step 527.

Thereafter, once the number of pixels of the one reference frame has been calculated, the criteria for the selection of a virtual advertisement image may be selected based on the calculated number of pixels at step 528.

For example, once the number of pixels of the reference frame has been calculated at step 527 of calculating the number of the pixels of the virtual advertising region included in the reference frame, selection criteria that limit the virtual advertisement image, which can be inserted into the virtual advertising region of the original image, to only a virtual advertisement image having a resolution equal to or higher than the number of pixels may be generated at step 528 of generating selection criteria.

According to another example, at step 528 of generating selection criteria, a resolution range may be set based on the number of pixels calculated for the reference frame, and selection criteria that allow only a virtual advertisement image having resolution within the set resolution range to be inserted into a virtual advertising region may be generated.

In this case, the resolution range is not particularly limited as described above, and thus the minimum and maximum values of the resolution range may be set to values smaller and larger than the calculated number of pixels, respectively.

In this case, the resolution range, i.e., a selection criterion, may be generated using criteria information set by a user via a preprocessing process in advance.

Referring back to FIG. 5, once the criteria for the selection of a virtual advertisement image has been generated at step 520, one or more virtual advertisement images to be inserted into the virtual advertising region of the original image may be selected or generated in compliance with the generated selection criteria at step 530.

At step 530, the virtual advertisement image selection device 100 may determine whether there are one or more candidate virtual advertisement images for the original image.

In this case, the candidate virtual advertisement images for the original image may be received from an advertiser who wants to place an advertisement in advance, or generated virtual advertisement images may be stored and managed as the candidate virtual advertisement images.

Once the criteria for the selection of a virtual advertisement image has been generation at step 528, the virtual advertisement image selection device 100 may determine whether one or more candidate virtual advertisement images that will be inserted into the virtual advertising region of the received original image are present. If, as a result of the determination, it is determined that a plurality of candidate virtual advertisement images is present, a candidate virtual advertisement image that satisfies the selection criteria may be selected from the candidate virtual advertisement images as a virtual advertisement image that will be inserted into the original image.

Meanwhile, at step 530, the virtual advertisement image may be selected so that the resolution of the virtual advertisement to be inserted into the advertising region of each frame varies based on the various sizes of the advertising regions of respective clustered frames.

For example, a virtual advertisement image to be inserted may be selected for each frame so that the resolution of the virtual advertisement to be inserted into the virtual advertising region of each frame is proportional to the size of the virtual advertising region of the frame.

If, as a result of the determination, it is determined that there is no candidate virtual advertisement image to be inserted into the original image, a virtual advertisement image for a corresponding advertising item may be generated, and may be variously modified to harmonize with the virtual advertisement target of each frame.

Figure 7:
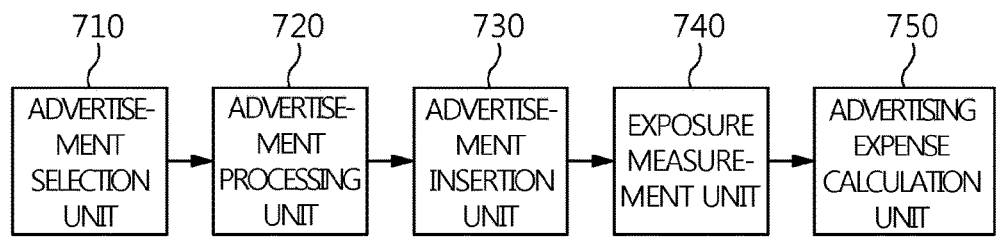
FIG. 7 is a block diagram showing an apparatus for calculating virtual indirect advertisement expenses according to an embodiment of the present invention.

FIG. 7 is a block diagram showing an apparatus for calculating virtual indirect advertisement expenses according to an embodiment of the present invention.

The apparatus for calculating virtual indirect advertisement expenses according to the present embodiment may be an apparatus corresponding to an advertising expense calculation unit included in the apparatus for providing a virtual advertisement according to the present invention.

Referring to FIG. 7, the apparatus for calculating virtual indirect advertisement expenses according to the embodiment of the present invention includes an advertisement selection unit 710, an advertisement processing unit 720, an advertisement insertion unit 730, an exposure measurement unit 740, and an advertising expense calculation unit 750.

The advertisement selection unit 710 selects a virtual indirect advertisement that will be inserted into video image content.

The advertisement processing unit 720 processes the virtual indirect advertisement based on a preliminary processing characteristic so that the virtual indirect advertisement can be inserted into the video image content.

In this case, the preliminary processing characteristic may include any one or more of the size of the portion of the virtual indirect advertisement which is exposed in video image content, the deformation which is made based on an angle, the size of the portion of the virtual indirect advertisement which is covered with another object, and the speed at which the virtual indirect advertisement moves within a screen.

The advertisement insertion unit 730 inserts the processed virtual indirect advertisement into the video image content.

In this case, the advertisement insertion unit 730 may insert a new advertisement at each location at which the virtual indirect advertisement is exposed when an exposure level measured by the exposure measurement unit 740 reaches a preset criterion.

Accordingly, a consumer is prevented from feeling weariness from and having repulsion toward a single virtual indirect advertisement by preventing the single advertisement from being excessively exposed, and advertising profits can be maximized by sequentially inserting a plurality of virtual indirect advertisements.

In this case, a preset criterion at a location closer to the center of a screen may be lower than a preset criterion at a location remoter from the center of the screen.

Accordingly, at a location where a consumer may easily feel weariness from and have repulsion toward a virtual indirect advertisement, the virtual indirect advertisement may be more rapidly replaced in order to prevent the above problem.

The exposure measurement unit 740 measures the exposure level of the virtual indirect advertisement based on exposure characteristics in which the virtual indirect advertisement is exposed in the video image content.

In this case, the exposure characteristics may include a real-time characteristic, which is exposed in the video image content and measured in real time, and the preliminary processing characteristic.

In this case, the real-time characteristic may include any one of the time during which the virtual indirect advertisement is exposed in the video image content, the frequency at which the virtual indirect advertisement is covered with another object, and the location at which the virtual indirect advertisement is disposed in a screen.

In this case, any one of the size of the portion of the virtual indirect advertisement which is exposed in video image content, the deformation which is made based on an angle, the size of the portion of the virtual indirect advertisement which is covered with another object, and the speed at which the virtual indirect advertisement moves within a screen, which are included in preliminary processing characteristic, is not measured by the exposure measurement unit 740 in real time. The exposure level may be measured based on information when the virtual indirect advertisement is processed by the advertisement processing unit 120.

The advertising expense calculation unit 750 calculates the advertising expenses of the virtual indirect advertisement based on the exposure level.

That is, the advertising expenses of the virtual indirect advertisement are calculated in proportion to the exposure level.

Figure 8:
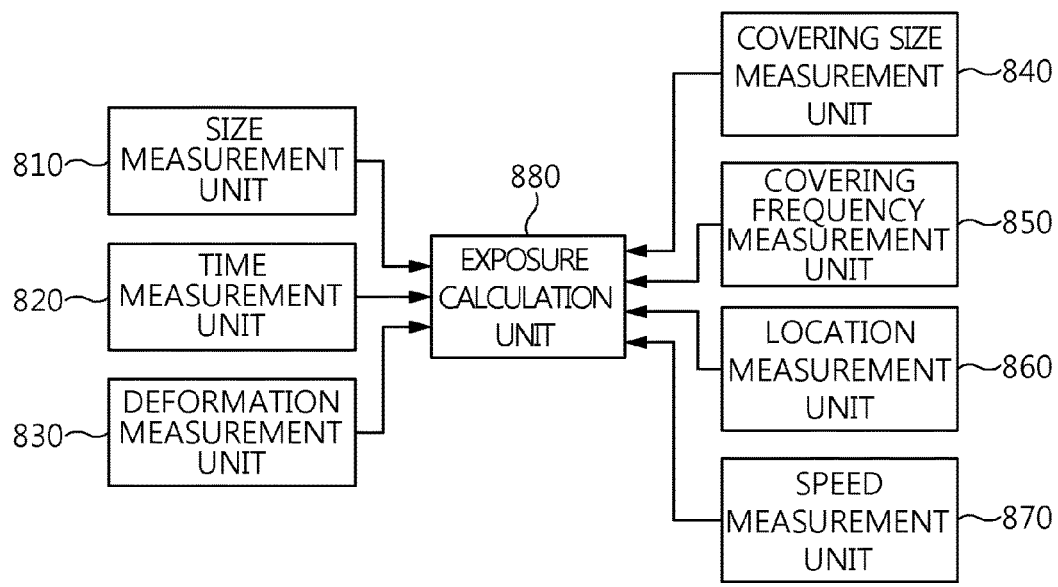
FIG. 8 is a block diagram showing an example of the exposure measurement unit shown in FIG. 7.

FIG. 8 is a block diagram showing an example of the exposure measurement unit shown in FIG. 7.

Referring to FIG. 8, the exposure measurement unit shown in FIG. 7 includes a size measurement unit 810, a time measurement unit 820, a deformation measurement unit 830, a covering size measurement unit 840, a covering frequency measurement unit 850, a location measurement unit 860, a speed measurement unit 870, and an exposure calculation unit 880.

The size measurement unit 810 measures an exposure level in proportion to the ratio of the size of the region of a virtual indirect advertisement, which is exposed in video image content, to the size of an overall screen.

It will be apparent that the objective exposure level is in proportion to the size of the region of the virtual indirect advertisement which is exposed in the screen.

In this case, the size of the region of the virtual indirect advertisement which is exposed in the video image content may not be measured in real time, but may be measured based on information when the virtual indirect advertisement is processed by the advertisement processing unit.

The time measurement unit 820 measures the exposure level in proportion to the time during which the virtual indirect advertisement is exposed in the video image content.

It will be apparent that the objective exposure level is in proportion to the time during which the virtual indirect advertisement is exposed.

The deformation measurement unit 830 measures the level at which the virtual indirect advertisement is deformed based on the angle of the view point of a camera.

In this case, the deformation measurement unit 830 may measure the exposure level in inverse proportion to the difference between the angle at which the virtual indirect advertisement is exposed in the video image content and a preset reference angle.

In this case, the preset reference angle may be an angle corresponding to the front surface of the virtual indirect advertisement.

Accordingly, a deformation level is in proportion to the difference between the angle at which the virtual indirect advertisement is exposed and the angle corresponding to the front surface of the virtual indirect advertisement, and the exposure level is measured in inverse proportion to the difference.

In this case, the angle at which the virtual indirect advertisement is exposed in the video image content may not be measured in real time, but may be measured based on information when the virtual indirect advertisement is processed by the advertisement processing unit.

The covering size measurement unit 840 measures the exposure level in inverse proportion to the size of the region of the virtual indirect advertisement which is covered with another object while the virtual indirect advertisement is being exposed in the video image content.

It will be apparent that the exposure level is in inverse proportion to the level at which the virtual indirect advertisement is covered with another object.

In this case, the size of the region of the virtual indirect advertisement which is covered with another object while the virtual indirect advertisement is being exposed in the video image content may not be measured in real time, but may be measured based on information when the virtual indirect advertisement is processed by the advertisement processing unit.

The covering frequency measurement unit 850 measures the exposure level in inverse proportion to the frequency at which the virtual indirect advertisement is covered with another object while the virtual indirect advertisement is being exposed in the video image content.

It will be apparent that the exposure level is in inverse proportion to the frequency at which the virtual indirect advertisement is covered with another object.

The location measurement unit 860 measures the exposure level in proportion to the proximity of the disposed virtual indirect advertisement to the center of a screen.

That is, a virtual indirect advertisement that is disposed closer to the center of a screen may be a virtual indirect advertisement having higher prominence. A viewer will be more interested in a virtual indirect advertisement having higher prominence. The exposure level is measured in proportion to the prominence of a virtual indirect advertisement.

The speed measurement unit 870 measures the exposure level in inverse proportion to the speed at which the virtual indirect advertisement moves within a screen while the virtual indirect advertisement is being exposed in the video image content.

That is, since it becomes difficult for a viewer to identify or be interested in a virtual indirect advertisement in proportion to the speed at which the virtual indirect advertisement moves within a screen, the exposure level is measured in inverse proportion to the speed.

In this case, the speed at which the virtual indirect advertisement moves within a screen while the virtual indirect advertisement is being exposed in the video image content may not be measured in real time, but may be measured based on information when the virtual indirect advertisement is processed by the advertisement processing unit.

The exposure calculation unit 880 calculates a total exposure level by collecting the exposure levels measured based on the exposure characteristics.

In this case, different weights may be applied to the respective criteria.

For example, an exposure level measured based on the size of an exposed region may have a larger weight than an exposure level measured based on deformation based on an angle.

In this case, the advertising expense calculation unit calculates advertising expenses based on the total exposure level.

FIG. 9 is a diagram showing an example of a formula calculated by the exposure measurement unit shown in FIG. 7.

Referring to FIG. 9, the formula calculated by the exposure measurement unit shown in FIG. 7 includes coefficients a to g and variables E, S, T, A, C, F, D and V.

The variable E denotes an exposure level. This is derived from the formula shown in FIG. 3.

The variable S denotes the size of the region of the virtual indirect advertisement which is exposed in the video image content.

In this case, S is calculated by dividing the number of pixels of the exposed region by the number of pixels of an overall screen.

The exposure level is calculated in proportion to the variable S.

The variable T denotes the time during which the virtual indirect advertisement is exposed in the video image content.

In this case, the variable T may be calculated in seconds, milliseconds, on a frame count basis, or the like.

The exposure level is calculated in proportion to the variable T.

The variable A denotes the level at which the virtual indirect advertisement is deformed based on an angle while the virtual indirect advertisement is being exposed in the video image content.

In this case, the variable A is calculated based on the difference between a preset reference angle and the angle at which the virtual indirect advertisement is exposed in the video image content.

In this case, the preset reference angle may be an angle corresponding to the front surface of the virtual indirect advertisement.

The exposure level is calculated in inverse proportion to the variable A.

The variable C denotes the size of the region of the virtual indirect advertisement is covered with another object while the virtual indirect advertisement is being exposed in the video image content.

The variable C is calculated by dividing the number of pixels included in the region covered with another object by the number of pixels included in the region of the virtual indirect advertisement that is exposed in the video image content.

The exposure level is calculated in inverse proportion to the variable C.

The variable F denotes the frequency at which the virtual indirect advertisement is covered with another object while the virtual indirect advertisement is being exposed in the video image content.

The variable F is calculated by dividing the time during which the virtual indirect advertisement is covered with another object in the video image content by an overall exposure time.

The exposure level is calculated in inverse proportion to the variable F.

The variable D denotes the distance between the location at which the virtual indirect advertisement is exposed in the video image content and the center of a screen.

The exposure level is calculated in inverse proportion to the variable D.

The variable V denotes the speed at which the virtual indirect advertisement moves within a screen while the virtual indirect advertisement is being exposed in the video image content.

The exposure level is calculated in inverse proportion to the variable V.

A method by which the exposure level is calculated by the exposure measurement unit is not limited to the formula shown in FIG. 9, the exposure level may be differently calculated in accordance with a formula different from the formula shown in FIG. 9.

Figure 10:
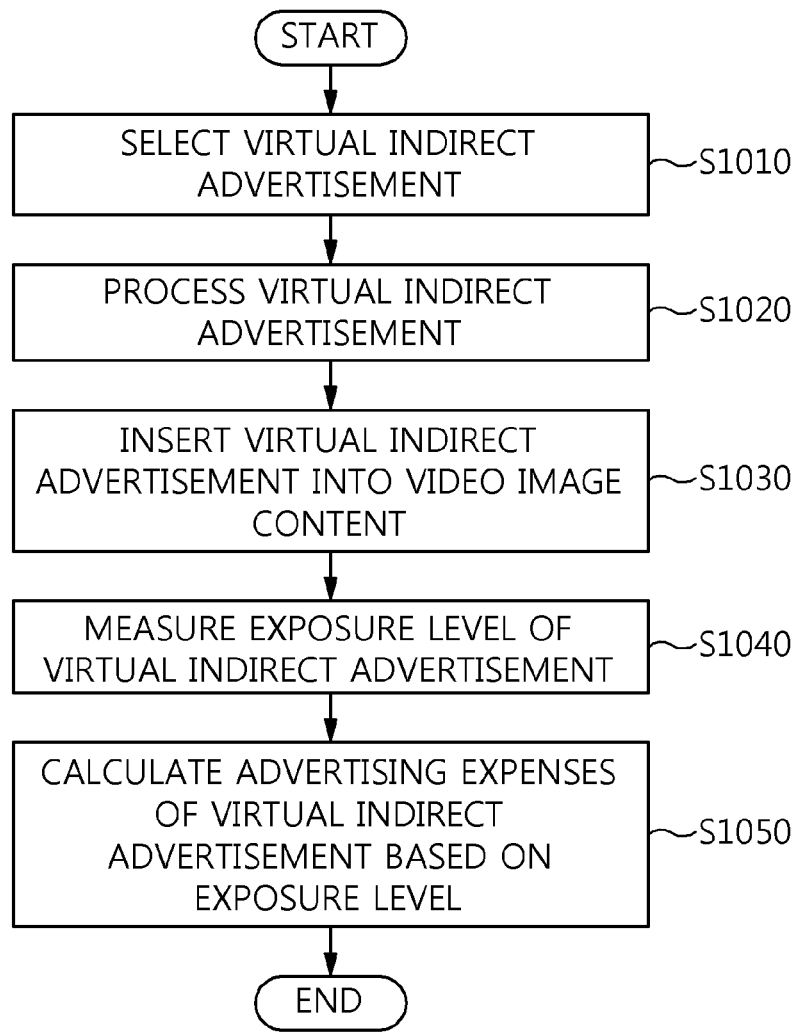
FIG. 10 is an operation flowchart showing a method of calculating virtual indirect advertisement expenses according to an embodiment of the present invention.

FIG. 10 is an operation flowchart showing a method of calculating virtual indirect advertisement expenses according to an embodiment of the present invention.

In this case, a method of providing a virtual advertisement provision according to an embodiment of the present invention may include the content of the method of calculating virtual indirect advertisement expenses.

Referring to FIG. 10, the method of calculating virtual indirect advertisement expenses according to the embodiment of the present invention selects a virtual indirect advertisement that will be inserted into video image content at step S1010.

Furthermore, the method of calculating virtual indirect advertisement expenses according to the embodiment of the present invention processes the virtual indirect advertisement based on a preliminary processing characteristic so that the virtual indirect advertisement can be inserted into the video image content at step S1020.

In this case, the preliminary processing characteristic may include any one or more of the size of the portion of the virtual indirect advertisement which is exposed in video image content, the deformation which is made based on an angle, the size of the portion of the virtual indirect advertisement which is covered with another object, and the speed at which the virtual indirect advertisement moves within a screen.

Furthermore, the method of calculating virtual indirect advertisement expenses according to the embodiment of the present invention inserts the processed virtual indirect advertisement into the video image content at step S1030.

Although not shown in FIG. 4, the step of inserting an advertisement may inserts a new advertisement at each location where the virtual indirect advertisement is exposed when the exposure level measured at the step of measuring an exposure level reaches a preset criterion.

Accordingly, a consumer is prevented from feeling weariness from and having repulsion toward a single virtual indirect advertisement by preventing the single advertisement from being excessively exposed, and advertising profits can be maximized by sequentially inserting a plurality of virtual indirect advertisements.

In this case, a preset criterion at a location closer to the center of a screen may be lower than a preset criterion at a location remoter from the center of the screen.

Accordingly, at a location where a consumer may easily feel weariness from and have repulsion toward a virtual indirect advertisement, the virtual indirect advertisement may be more rapidly replaced in order to prevent the above problem.

Furthermore, the method of calculating virtual indirect advertisement expenses according to the embodiment of the present invention measures the exposure level of the virtual indirect advertisement based on exposure characteristics in which the virtual indirect advertisement is exposed in the video image content at step S1040.

In this case, the exposure characteristics may include a real-time characteristic, which is exposed in the video image content and measured in real time, and the preliminary processing characteristic.

In this case, the real-time characteristic may include any one of the time during which the virtual indirect advertisement is exposed in the video image content, the frequency at which the virtual indirect advertisement is covered with another object, and the location at which the virtual indirect advertisement is disposed in a screen.

In this case, any one of the size of the portion of the virtual indirect advertisement which is exposed in video image content, the deformation which is made based on an angle, the size of the portion of the virtual indirect advertisement which is covered with another object, and the speed at which the virtual indirect advertisement moves within a screen, which are included in preliminary processing characteristic, is not measured at the step of measuring an exposure level in real time. The exposure level may be measured based on information when the virtual indirect advertisement is processed at the step of processing an advertisement.

Furthermore, the method of calculating virtual indirect advertisement expenses according to the embodiment of the present invention calculates the advertising expenses of the virtual indirect advertisement based on the exposure level at step S1050.

That is, the advertising expenses of the virtual indirect advertisement are calculated in proportion to the exposure level.

Figure 11:
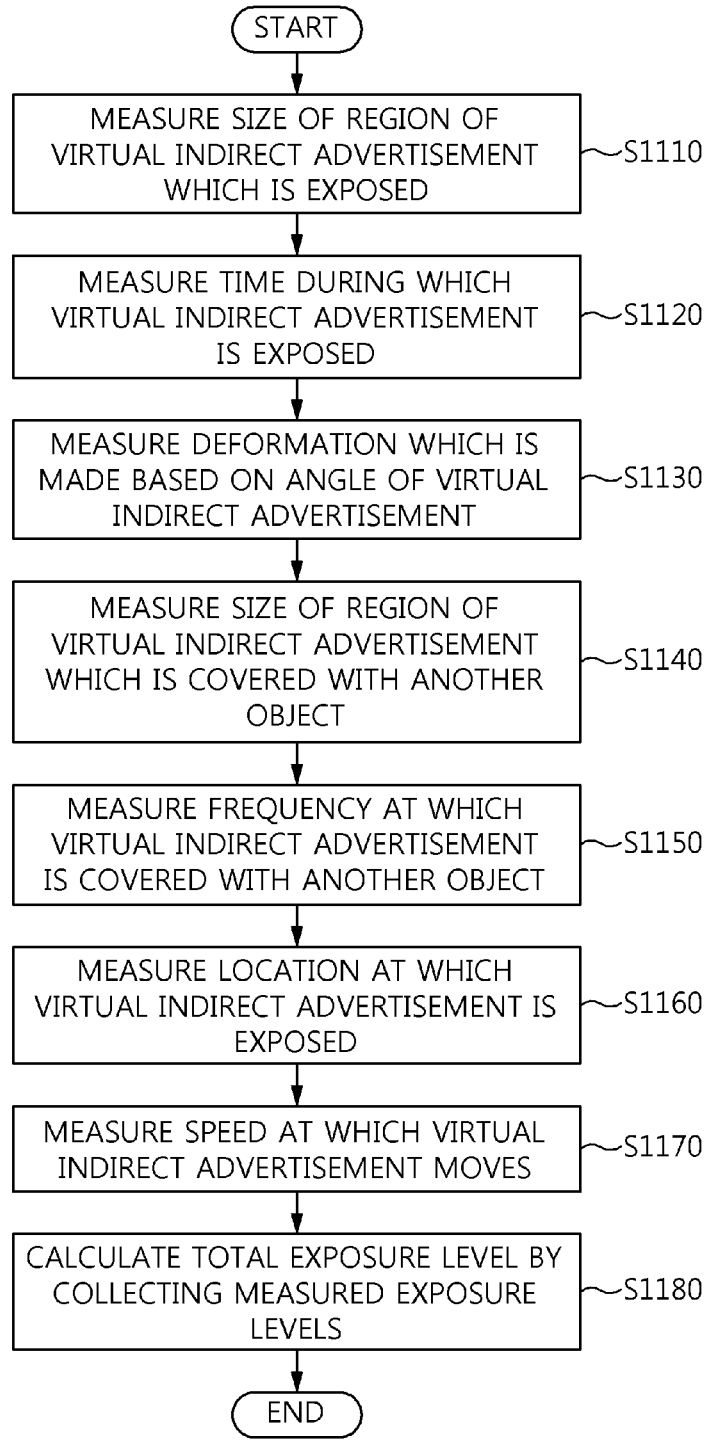
FIG. 11 is an operation flowchart showing an example of the step of measuring an exposure level shown in FIG. 10.

FIG. 11 is an operation flowchart showing an example of the step of measuring an exposure level shown in FIG. 10.

Referring to FIG. 11, the step of measuring an exposure level shown in FIG. 10 measures an exposure level in proportion to the ratio of the size of the region of virtual indirect advertisement, which is exposed in video image content, to the size of an overall screen at step S1110.

It will be apparent that the objective exposure level is in proportion to the size of the region of the virtual indirect advertisement which is exposed in the screen.

In this case, the size of the region of the virtual indirect advertisement which is exposed in the video image content may not be measured in real time, but may be measured based on information when the virtual indirect advertisement is processed at the step of processing an advertisement.

Furthermore, the step of measuring an exposure level shown in FIG. 10 measures the exposure level in proportion to the time during which the virtual indirect advertisement is exposed in the video image content at step S1120.

It will be apparent that the objective exposure level is in proportion to the time during which the virtual indirect advertisement is exposed.

Furthermore, the step of measuring an exposure level shown in FIG. 10 measures the level at which the virtual indirect advertisement is deformed based on the angle of the view point of a camera at step S1130.

In this case, the step of measuring an exposure level shown in FIG. 10 may measure the exposure level in inverse proportion to the difference between the angle at which the virtual indirect advertisement is exposed in the video image content and a preset reference angle.

In this case, the preset reference angle may be an angle corresponding to the front surface of the virtual indirect advertisement.

Accordingly, a deformation level is in proportion to the difference between the angle at which the virtual indirect advertisement is exposed and the angle corresponding to the front surface of the virtual indirect advertisement, and the exposure level is measured in inverse proportion to the difference.

In this case, the angle at which the virtual indirect advertisement is exposed in the video image content may not be measured in real time, but may be measured based on information when the virtual indirect advertisement is processed at the step of processing an advertisement.

Furthermore, the step of measuring an exposure level shown in FIG. 10 measures the exposure level in inverse proportion to the size of the region of the virtual indirect advertisement which is covered with another object while the virtual indirect advertisement is being exposed in the video image content at step S1140.

It will be apparent that the exposure level is in inverse proportion to the level at which the virtual indirect advertisement is covered with another object.

In this case, the size of the region of the virtual indirect advertisement which is covered with another object while the virtual indirect advertisement is being exposed in the video image content may not be measured in real time, but may be measured based on information when the virtual indirect advertisement is processed at the step of processing an advertisement.

Furthermore, the step of measuring an exposure level shown in FIG. 10 measures the exposure level in inverse proportion to the frequency at which the virtual indirect advertisement is covered with another object while the virtual indirect advertisement is being exposed in the video image content at step S1150.

It will be apparent that the exposure level is in inverse proportion to the frequency at which the virtual indirect advertisement is covered with another object.

Furthermore, the step of measuring an exposure level shown in FIG. 10 measures the exposure level in proportion to the proximity of the disposed virtual indirect advertisement to the center of a screen at step S1160.

That is, a virtual indirect advertisement that is disposed closer to the center of a screen may be a virtual indirect advertisement having higher prominence. A viewer will be more interested in a virtual indirect advertisement having higher prominence. The exposure level is measured in proportion to the prominence of a virtual indirect advertisement.

Furthermore, the step of measuring an exposure level shown in FIG. 10 measures the exposure level in inverse proportion to the speed at which the virtual indirect advertisement moves within a screen while the virtual indirect advertisement is being exposed in the video image content at step S1180.

That is, since it becomes difficult for a viewer to identify or be interested in a virtual indirect advertisement in proportion to the speed at which the virtual indirect advertisement moves within a screen, the exposure level is measured in inverse proportion to the speed.

In this case, the speed at which the virtual indirect advertisement moves within a screen while the virtual indirect advertisement is being exposed in the video image content may not be measured in real time, but may be measured based on information when the virtual indirect advertisement is processed at the step of processing an advertisement.

Furthermore, the step of measuring an exposure level shown in FIG. 10 calculates a total exposure level by collecting the exposure levels measured based on the exposure characteristics at step S1180.

In this case, different weights may be applied to the respective criteria.

For example, an exposure level measured based on the size of an exposed region may have a larger weight than an exposure level measured based on deformation based on an angle.

In this case, the step of calculating advertising expenses calculates advertising expenses based on the total exposure level.

The steps shown in each of FIGS. 10 and 11 may be performed in the sequence shown in FIG. 10 or 11, in a sequence reverse to the former sequence, or concurrently.

A computer-readable medium appropriate to the storage of computer program instructions and data includes, for example, magnetic media such as a hard disk, a floppy disk and magnetic tape, optical media such as compact disk (CD)-read only memory (ROM) and a digital versatile disk (DVD), magneto-optical media such as a floptical disk, and semiconductor memory such as ROM, random access memory (RAM), flash memory, Erasable Programmable ROM (EPROM) and Electrically Erasable Programmable (EEPROMROM). A processor or memory may be supplemented or integrated with a specific purpose logic circuit. Examples of program instructions may include high-level language code executed by a computer using an interpreter as well as machine code created by a compiler. The hardware apparatus may function as at least one software module configured to perform the operation of the present invention, and vice versa.

While this specification contains many specific implementation details, these should not be construed as limitations on the scope of any invention or of what may be claimed, but rather as descriptions of features that may be specific to particular embodiments of particular inventions. Specific features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single software product or packaged into multiple software products.

Meanwhile, the embodiments of the present invention disclosed in the present specification and the drawings are intended merely to present specific examples in order to help the understanding of the present invention, and are not intended to limit the scope of the present invention. It will be apparent to those having ordinary knowledge in the art to which the present invention pertains that other modified embodiments based on the spirit of the present invention can be made in addition to the embodiments disclosed herein.

INDUSTRIAL APPLICABILITY

The present invention is directed to a technology that synthesizes a virtual advertisement image with a moving image and provides a virtual advertisement to users. The present invention provides a technology that determines the size of a virtual advertisement image, which can be inserted into a moving image, while taking into account the size of a virtual advertising region within the moving image and selects an appropriate virtual advertisement image based on the size of the determined virtual advertisement image. According to the embodiments of the present invention, an appropriate virtual advertisement image is selected based on the size of a virtual advertising region varying depending on the angle of a camera, the posture of a virtual advertisement object or the like, and the virtual advertisement selected as described above is synthesized with the advertising region of a moving image, thereby achieving the advantage of providing an optimal virtual advertising effect while minimizing incompatibility with an original moving image. Accordingly, the embodiments of the present invention are expected to enjoy high utilization in light of the fact that indirect advertisement and virtual advertisement are used in various fields, such as general broadcasting, sports broadcasting, etc. in line with a recent increase in the scale of the advertising market. Furthermore, a virtual indirect advertisement can be processed and then inserted into video image content, the objective exposure level of the inserted virtual indirect advertisement can be measured, and advertising expenses can be calculated based on the measured objective exposure level. Since a method of calculating advertising expenses is transparent and objective, an advertiser can easily accept advertising expenses and request advertising. Furthermore, advertising profits can be maximized by substituting a new advertisement for a virtual indirect advertisement that has been exposed above a predetermined criterion.

The invention claimed is:

1. An apparatus for providing a virtual advertisement, comprising:
   a memory; and
   a processor configured to execute instructions stored in the memory and to:
     receive an original image;
     select a virtual advertisement image appropriate for insertion into the original image based on a resolution;
     process the virtual advertisement image;
     insert the virtual advertisement image into the original image;
     calculate advertising expenses by measuring an exposure level of the virtual advertisement image;
     generate a selection criteria based on a size of a virtual advertising region included in the original image, wherein the selection criteria comprises a resolution criteria for the virtual advertisement image to be inserted into the virtual advertising region;
     select the virtual advertisement image to be inserted into an advertising region included in the original image based on the generated selection criteria;
     cluster a plurality of frames including the advertising region included in the original image; and
     select any frame of the plurality of frames based on a size of the advertising region included in the clustered frames,
   wherein, when generating the selection criteria, the processor is further configured to:
     receive the original image on a per frame basis;
     determine whether a current frame of the original image includes a virtual advertising region;
     cluster the current frame of the original image as a frame having the virtual advertising region after the current frame of the original image is determined to include the virtual advertising region;
     determine whether the current frame of the original image is a last frame of the received original image after clustering the current frame of the original image;
     determine whether the current frame of the original image is the last frame of the received original image after the current frame of the original image is determined not to include the virtual advertising region; and
     receive a next frame of the original image after the current frame of the original frame is determined not to be the last frame of the received original image.

2. The apparatus of claim 1, wherein the processor is configured to:

calculate the size of the advertising region included in each of the clustered frames; and select a frame having a size, which is the largest in the calculated sizes of the advertising regions, as any frame of the plurality of frames.

3. The apparatus of claim 1, wherein the processor is configured to calculate a number of pixels of the advertising region included in the selected frame when the any one frame has been selected by the frame selection unit.

4. The apparatus of claim 3, wherein the processor is configured to generate the selection criteria for the virtual advertisement image based on the calculated number of pixels.

5. The apparatus of claim 4, wherein the processor is configured to:
generate the resolution criterion so the resolution criterion has a resolution larger than the calculated number of pixels; and
limit the virtual advertisement image to be inserted into the original image to only a virtual advertisement image that satisfies the resolution criterion.

6. The apparatus of claim 1, wherein the processor is configured to select one or more virtual advertisement images, to be inserted into the advertising region of each of the clustered frames, from candidate virtual advertisement images that satisfy the selection criteria.

7. The apparatus of claim 6, wherein the processor is configured to select the virtual advertisement image to be inserted into the advertising region of each of the frames so that a resolution of the virtual advertisement image to be inserted into the advertising region is proportional to a size of the advertising region of the corresponding frame.

8. The apparatus of claim 1, wherein the processor is further configured to:
process the virtual advertisement image based on a preliminary processing characteristic so that the virtual advertisement image can be inserted into the original image;
insert the processed virtual advertisement image into the original image;
measure the exposure level of the virtual advertisement image based on exposure characteristics in which the virtual advertisement image is exposed in the original image; and
calculate the advertising expenses of the virtual advertisement image based on the exposure level.

9. The apparatus of claim 8, wherein the exposure characteristics comprise a real-time characteristic, measured in real time while the virtual advertisement image is being exposed in the original image, and the preliminary processing characteristic.

10. The apparatus of claim 9, wherein the processor is configured to insert a new advertisement at each location where the virtual advertisement image is exposed when the exposure level reaches a preset criterion.

11. The apparatus of claim 9, wherein the processor is further configured to:
measure the exposure level in proportion to a ratio of a size of an exposed region of the virtual advertisement image, which is exposed in the original image, to a size of the overall screen;
measure the exposure level in proportion to a time during which the virtual advertisement image is exposed in the original image;
a deformation measurement unit configured to measure the exposure level in inverse proportion to a difference between an angle at which the virtual advertisement image is exposed in the original image and a preset reference angle;
measure the exposure level in inverse proportion to a size of a region of the virtual advertisement image that is covered with another object while the virtual advertisement image is being exposed in the original image;
measure the exposure level in inverse proportion to a frequency at which the virtual advertisement image is covered with another object while the virtual advertisement image is being exposed in the original image;
measure the exposure level in proportion to a proximity of the virtual advertisement image to a center of the screen;
measure the exposure level in inverse proportion to a speed at which the virtual advertisement image moves within the screen while the virtual advertisement image is being exposed in the original image;
calculate a total exposure level by collecting exposure levels measured based on the exposure characteristics; and
measure the advertising expenses in proportion to the total exposure level.

12. A method of providing a virtual advertisement, comprising:
receiving an original image;
selecting a virtual advertisement image appropriate for insertion into the original image based on a resolution;
processing the virtual advertisement image;
inserting the virtual advertisement image into the original image; and
calculating advertising expenses by measuring an exposure level of the virtual advertisement image,
wherein selecting the virtual advertisement image comprises:
receiving the original image;
generating a selection criteria including a resolution criteria for the virtual advertisement image based on a size of a virtual advertising region included in the original image; and
selecting the virtual advertisement image to be inserted into the original image based on the generated selection criteria,
wherein calculating the advertising expenses comprises:
selecting the virtual advertisement image to be inserted into the original image;
processing the virtual advertisement image based on a preliminary processing characteristic such that the virtual advertisement image is inserted into the original image;
inserting the processed virtual advertisement image into the original image;
measuring an exposure level of the virtual advertisement image based on exposure characteristics in which the virtual advertisement image is exposed in the original image; and
calculating an advertising expenses of the virtual advertisement image based on the exposure level, and
wherein generating the selection criteria comprises:
receiving the original image on a per frame basis;
determining whether a current frame of the original image includes a virtual advertising region;
clustering the current frame of the original image as a frame having the virtual advertising region after the current frame of the original image is determined to include the virtual advertising region;

determining whether the current frame of the original image is a last frame of the received original image after clustering the current frame of the original image;

determining whether the current frame of the original image is the last frame of the received original image after the current frame of the original image is determined not to include the virtual advertising region; and receiving a next frame of the original image after the current frame of the original frame is determined not to be the last frame of the received original image.

13. A computer-readable storage medium having stored thereon a program for executing a method of providing a virtual advertisement, the method comprising:

receiving an original image; and selecting a virtual advertisement image appropriate for insertion into the original image based on a resolution;

processing the virtual advertisement image;

inserting the virtual advertisement image into the original image; and calculating advertising expenses by measuring an exposure level of the virtual advertisement image, wherein selecting the virtual advertisement image comprises:

receiving the original image;

generating a selection criteria including a resolution criteria for the virtual advertisement image based on a size of a virtual advertising region included in the original image; and selecting the virtual advertisement image to be inserted into the original image based on the generated selection criteria, wherein calculating the advertising expenses comprises:

selecting the virtual advertisement image to be inserted into the original image;

processing the virtual advertisement image based on a preliminary processing characteristic such that the virtual advertisement image is inserted into the original image;

inserting the processed virtual advertisement image into the original image;

measuring an exposure level of the virtual advertisement image based on exposure characteristics in which the virtual advertisement image is exposed in the original image; and calculating an advertising expenses of the virtual advertisement image based on the exposure level, and wherein generating the selection criteria comprises:

receiving the original image on a per frame basis;

determining whether a current frame of the original image includes a virtual advertising region;

clustering the current frame of the original image as a frame having the virtual advertising region after the current frame of the original image is determined to include the virtual advertising region;

determining whether the current frame of the original image is a last frame of the received original image after clustering the current frame of the original image;

determining whether the current frame of the original image is the last frame of the received original image after the current frame of the original image is determined not to include the virtual advertising region; and receiving a next frame of the original image after the current frame of the original frame is determined not to be the last frame of the received original image.

* * * * *